United States Patent [19]

Fischer

[11] Patent Number: 5,002,445
[45] Date of Patent: Mar. 26, 1991

[54] EXPANSIBLE PLUG ASSEMBLY TO BE ANCHORED IN A HOLE DRILLED IN MASONRY

[75] Inventor: Artur Fischer, Waldachtal/Tumlingen, Fed. Rep. of Germany

[73] Assignee: fischerwerke Artur Fischer GmbH & Co KG, Waldachtal/Tumlingen, Fed. Rep. of Germany

[21] Appl. No.: 465,456

[22] Filed: Jan. 16, 1990

[30] Foreign Application Priority Data

Jan. 13, 1989 [DE] Fed. Rep. of Germany ....... 3900828
Feb. 2, 1989 [DE] Fed. Rep. of Germany ....... 3903020

[51] Int. Cl.⁵ .............................................. F16B 13/06
[52] U.S. Cl. ........................................ 411/55; 411/60; 411/72
[58] Field of Search ................... 411/55, 57, 60, 61, 411/71, 72

[56] References Cited

U.S. PATENT DOCUMENTS

| | | | |
|---|---|---|---|
| 2,010,553 | 8/1935 | McIntosh | 411/60 |
| 2,026,686 | 1/1936 | Kirley | 411/57 |
| 2,470,924 | 5/1949 | Flogaus | 411/57 |
| 3,143,917 | 8/1964 | Conner | |
| 4,893,973 | 1/1990 | Herb | 411/55 |

FOREIGN PATENT DOCUMENTS

| | | | |
|---|---|---|---|
| 7806756 | 3/1978 | Fed. Rep. of Germany | |
| 671060 | 3/1929 | France | |
| 354920 | 7/1961 | Switzerland | |
| 19218 | of 1915 | United Kingdom | 411/72 |
| 886997 | 1/1962 | United Kingdom | 411/57 |
| 887388 | 1/1962 | United Kingdom | 411/60 |

Primary Examiner—Neill R. Wilson
Attorney, Agent, or Firm—Michael J. Striker

[57] ABSTRACT

An expansible plug assembly that comprises a fixing bolt, and an expansible sleeve having an expansible portion and an internal thread formed in the expansible portion and engaged with the external thread of the fixing bolt, so that a reliable connection between the fixing bolt and the expansible sleeve is formed.

3 Claims, 2 Drawing Sheets

EXPANSIBLE PLUG ASSEMBLY TO BE ANCHORED IN A HOLE DRILLED IN MASONRY

BACKGROUND OF THE INVENTION

The present invention relates to an expansible plug assembly comprising an expansible sleeve having an expansible portion and longitudinal bore tapering to the end of the expansible portion, and a fixing bolt.

Expansible plug assemblies comprising an expansible sleeve and a fixing bolt are known. The expansible sleeve has at its end an expansible region that can form a form-locking connection with an undercut of a drilled hole in which the expansible plug assembly is anchored. To this end, an expansion element is advanced into the expansible sleeve and into the expansible region. At that, the expansible segments that form the expansible region expand and engage the undercut.

To maintain a high retaining value, the plug assembly which sometimes is called an expansible anchor, is made of steel. Making the plug assembly from steel results in that a high expansion force is required for expanding the sleeve. Using appropriate conical expansion members permitted to obtain expansion forces required to effect expansion of expansible segments in conventional plug assemblies.

SUMMARY OF THE INVENTION

The object of the invention is to provide an expansible plug assembly formed of steel which is easy to manufacture and to mount, and which does not require a conical expansion member.

The object of the invention is achieved by providing an expansible plug assembly that comprises an expansible sleeve having an internal thread in the expansible region thereof that tapers to the end of the expansible region. Upon mounting of the expansible plug assembly, a fastening screw is introduced into the expansible sleeve and is screwed in the expansible region. It is preferable to use a hammer drill to screw in the fastening screw. As tests have shown, the use of such a hammer drill enables the fastening screw to be screwed in and the expansible segments which form the expansible region, to expand simultaneously without difficulty. The provision of an internal thread in the region of the expansible segments facilitates expansion process. A further result of this is that, in the expansible region, the threads of the fastening screw engage the internal thread of the expansible segments, whereby a very advantageous introduction into the expansible sleeve of the tension forces generated at the fastening screw is achieved. Also, a positive connection is produced between the fastening screw, the expansible segments and the masonry into which the expansible plug assembly is inserted.

After the expansion of the expansible segments by introducing the fastening screw has taken place, the external notches arranged as an external thread on the expansible segments, compensate advantageously tolerances in the undercut drilled hole. Such expansible segments likewise require a relatively low application of force during the expansion that takes place during mounting.

In an advantageous embodiment of the invention, the notch depth of the external thread increases toward the end face of the expansible segments. As a result the positive engagement of the expansible segments in the undercut drilled hole is ensured over the entire length of the segments. The positive engagement of the external notches arranged on the outer surface of the expansible segments is likewise achieved as a result of their inter-engagement with the side walls of the undercut hole, which guarantees accurate and reliable anchoring of the expansible plug assembly in the undercut drilled hole.

The expansible plug assembly forms a very simple unit comprising only two components. In the case of a screw mounting, the expansible plug assembly, in a preassembled condition of which the fastening screw is screwed into the expansible sleeve with two-three turns, is inserted through a bore of an object to be secured, into the drilled hole in masonry behind the object. This can be effected with a screwdriver drill. The expansion process begins, however, only when the expansible sleeve rests against the base of the drilled hole and, because of the friction that is produced, no longer turns with the fastening screw.

The expansible sleeve may have on its end facing the screw head of the fastening screw an integrally-formed collar that limits the depth to which the expansible plug penetrates. As soon as the collar comes to rest against the object to be fastened, for example a wooden board, friction is generated between the collar and the object to be secured, with the result that the fastening screw enters the expansible region and the expansion process takes place.

The method according to the invention provides for an especially advantageous manufacturing of the expansible sleeve. The expansible sleeve may be made from a cylindrical blank the external diameter of which corresponds to the external diameter of the expansible sleeve. According to the method of the invention, before the internal thread is cut, the expansible region is expanded with a pin or similar tool and, after the thread has been cut, the expansible segments are brought to their original position.

The present invention both as to its construction so to its method of operation, together with additional objects and advantages thereof, will be best understood from the following detailed description of specific embodiments when read in connection with the accompanying drawings.

DESCRIPTION OF THE PREFERRED EMBODIMENTS

Figure 1:
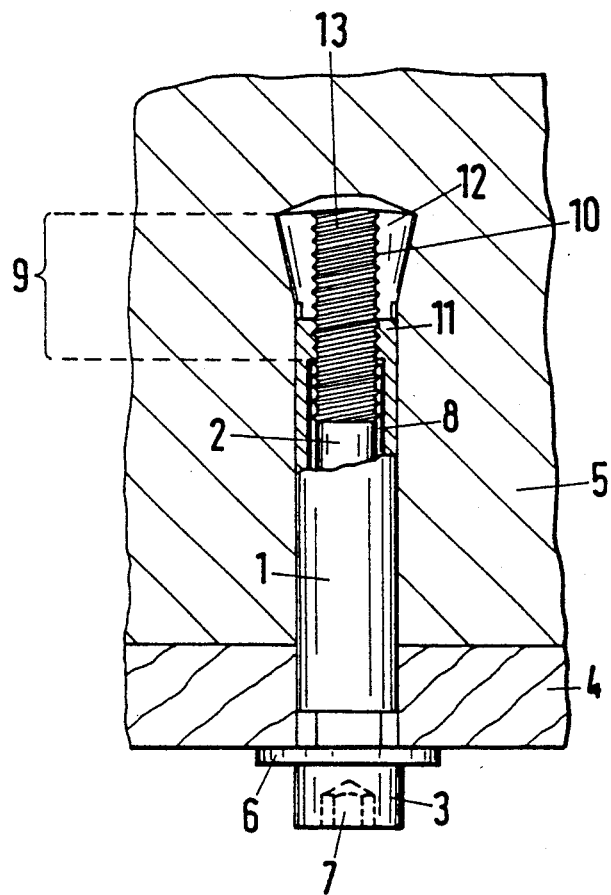
FIG. 1 shows a partially cross-sectional view of an expansible plug assembly according to the invention inserted in a hole drilled in masonry.

FIG. 1 shows an expansible plug assembly comprising an expansible sleeve 1 and a fixing bolt 2. The fixing bolt 2 has a head portion 3 for fixing an object 4 on an outer wall of a masonry 5. A washer 6 may be located between the head portion 3 and the object 4 that may be a part of a lattice structure. The head portion 3 has a hexagonal recess 7 for engagement with a hexagonal turning tool (not shown).

The sleeve 1 has a longitudinal bore 8 having a portion 9 with an internal thread 10. The portion 9 includes a small portion 11 of the cylindrical part of the bore 8 as well as the region of the expansible portion of the sleeve 1 formed by expansible segments 12. The fixing bolt 2 has an external thread 13 that engages the thread 10. Thereby a stable connection between the fixing bolt 2 and the expansible segment is insured.

Figure 2:
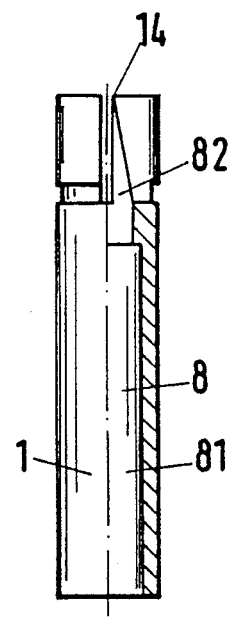
FIG. 2 shows a partially cross-sectional view of an expansible sleeve of the expansible plug assembly shown in FIG. 1.

The expansible sleeve 1 seen in FIG. 2, is shown without the internal thread. The longitudinal bore 8 of the sleeve 1 shown in FIG. 2, has a first bore portion 81 and a second bore portion 82 with a reducing diameter that tapers to a point toward the end 14 of the sleeve 1.

Figure 3:
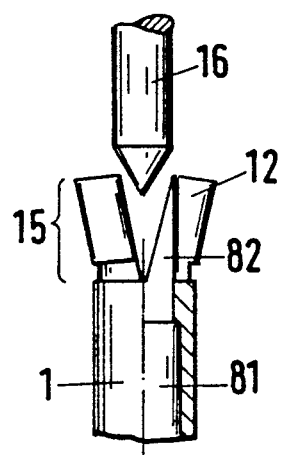
FIG. 3 shows a partial view of the expansible sleeve shown in FIG. 2 in an expanded condition and of an expansion pin.

To form an internal thread 10, the sleeve 1, as shown in FIG. 3, is widened in its expansible region with a pin 16 so that the bore portion 82 becomes cylindrical as shown in FIG. 3. After the bore portion 82 takes a cylindrical form, an internal thread 10 (such as shown in FIG. 1) can be cut with an appropriate thread cutter. After the internal thread 10 is cut, the segments 12 are brought to their initial position as shown in FIG. 4.

Figure 4:
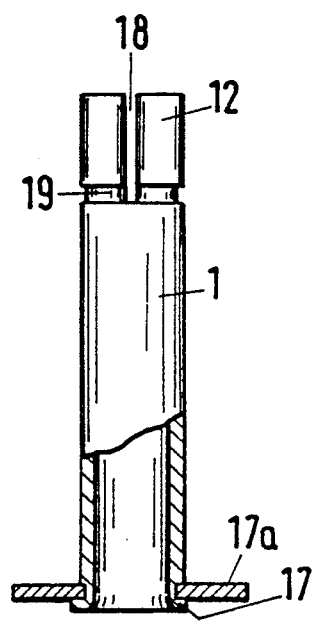
FIG. 4 shows a partially cross-sectional view of an expansible sleeve of the expansible plug assembly shown in FIG. 1 and provided with a collar.

The expansible sleeve shown in FIG. 4 has a collar 17a integrally formed therewith. The expansible sleeve 1 may be provided with a supporting washer 17 abutting the collar. With respect to all other features, the expansible sleeve 1 shown in FIG. 4 is identical to that shown in FIG. 1.

The segments 12 are formed in a known manner by slots 18 which extend up to an outer annular groove 19 formed on the sleeve 1. The annular groove 19 forms a transition between the cylindrical portion of the expansion sleeve 1 and the expansible region 15 thereof and conveniently and clearly defines the expansible region.

Figure 5:
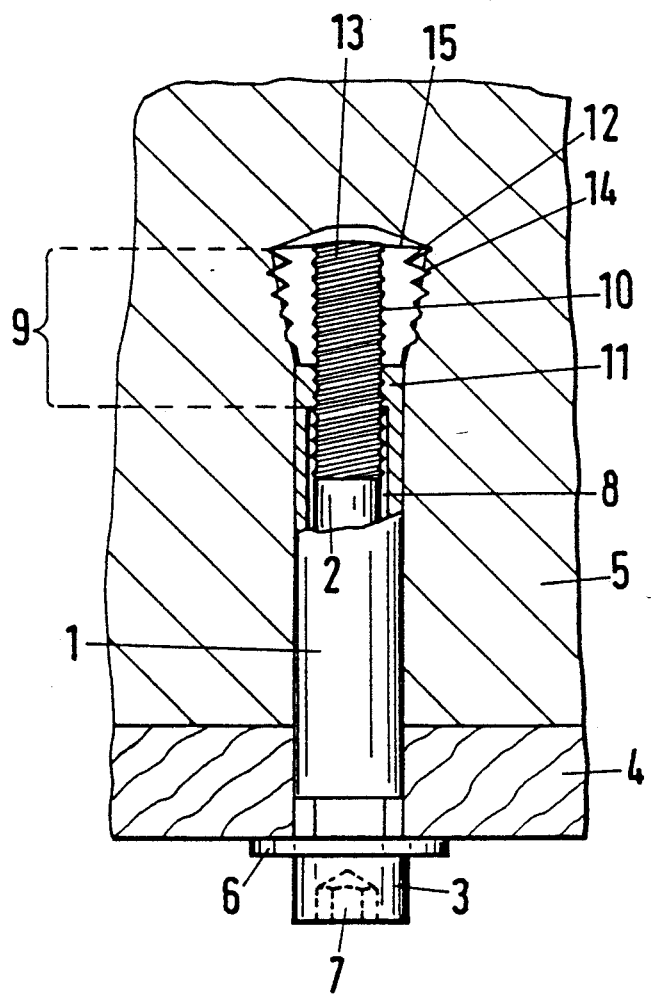
FIG. 5 shows an expansible plug assembly according to the invention and provided with external notches formed on the expansible segments of the expansible sleeve.

The expansible plug assembly shown in FIG. 5 comprises also an expansible sleeve 1 and a fixing bolt 2 having a head portion 3 for fixing an object 4 on the outer wall of a masonry 5. As in FIG. 1, a washer is located between the head portion 3 of the fixing bolt 2 and the object. The head portion 3 has a hexagonal recess 7 for engagement with a hexagonal turning tool, not shown. Similarly to FIG. 1, the expansible sleeve 1 has a bore 8 having portion 9 with an internal thread 10. The portion 9 includes a small portion 11 of the cylindrical part of the bore 8 and an expansible region defined by expansible segments 12. The fixing bolt 2 has an external thread 13 that engages the internal thread 10 providing a stable connection between the fixing bolt 2 and expansible segments 12. The expansible segments 12 have along the entire length thereof, outer notches 14 the depth of which increases toward the end 15 of the expansible sleeve 1.

While the invention has been illustrated and described with reference to specific embodiments of an expansible plug assembly, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An expansible plug assembly to be anchored in a hole drilled in a masonry, comprising an expansible sleeve including an expansible portion having an end, a cylindrical portion, an annular groove separating said expansible and cylindrical portions, a longitudinal bore defined by said expansible and cylindrical portions and having a cylindrical bore portion that coincides with said cylindrical portion of said expansible sleeve, and a reduced diameter portion that coincides with said expansible portion and tapers to said end of said expansible portion, and an internal thread extending over at least a part of said cylindrical bore portion of said longitudinal bore and over said reduced diameter portion of said longitudinal bore, said expansible portion being formed by a plurality of expansible segments having a plurality of notches which extend around said segments in a form of an outer thread and have a depth that increases to said end of said expansible portion; and a fixing bolt extending into said expansible portion for expanding the same.

2. An expansible plug assembly as set forth in claim 1, wherein said fixing bolt has an external thread having an outer diameter and engaging said internal thread of said expansible sleeve, said longitudinal bore including a portion extending to beginning of said internal thread and having a diameter corresponding to the outer diameter of said external thread of said fixing bolt.

3. An expansible plug assembly as set forth in claim 2, wherein said fixing bolt has a head portion, said expansible sleeve having an end opposite to said end of said expansible portion and located adjacent to said head portion of said bolt, and a collar at said opposite end.

* * * * *